(No Model.)   3 Sheets—Sheet 1.
G. F. CARLILE.
RAILWAY SIGNAL.
No. 340,698.  Patented Apr. 27, 1886.
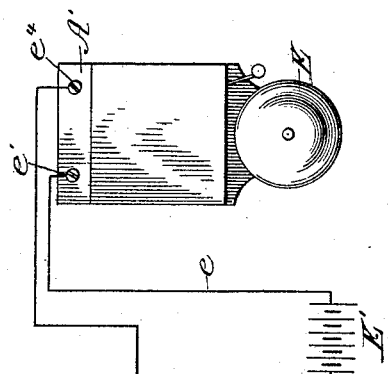
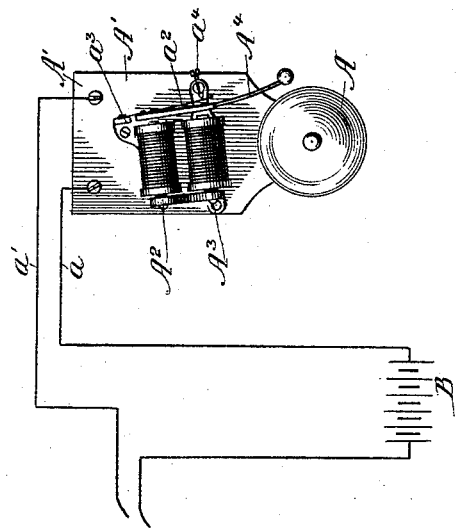
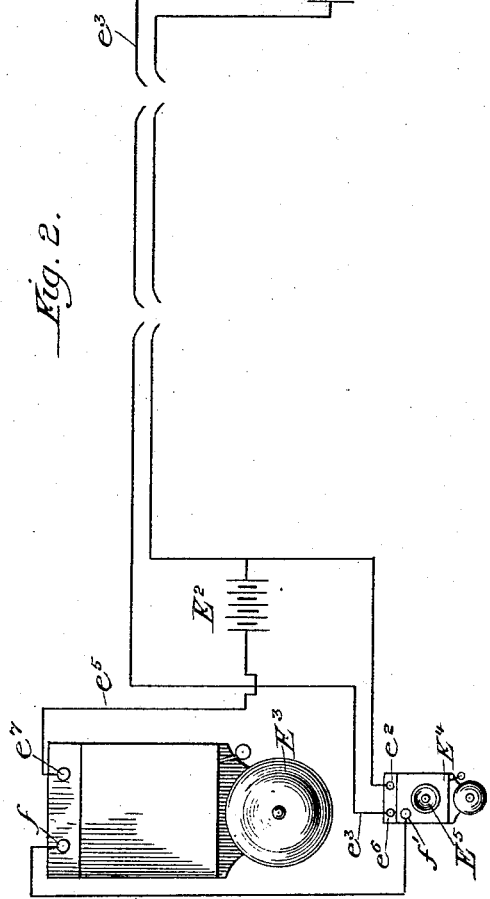
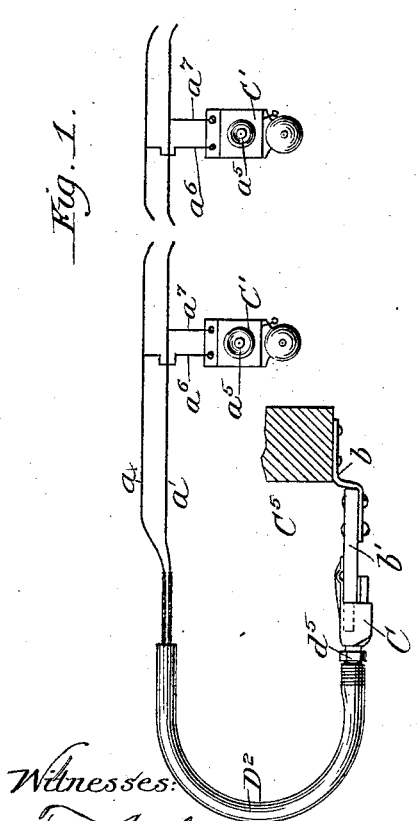
Fig. 1.
Fig. 2.
Witnesses:
Frank J. Blanchard
L. M. Freeman
Inventor:
Geo. F. Carlile
By L. B. Copeland & Co.
Attorneys

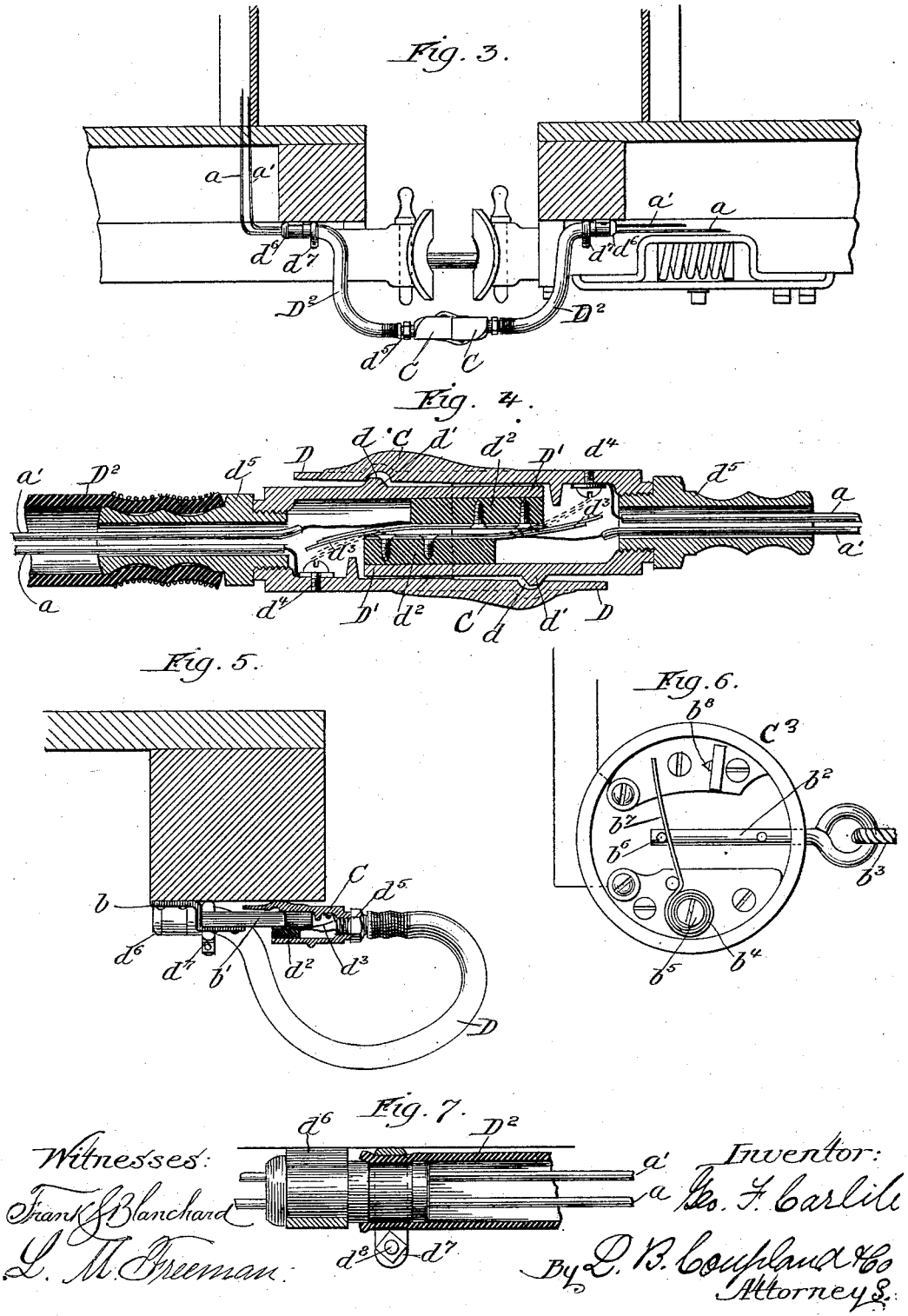

(No Model.) 3 Sheets—Sheet 3.

G. F. CARLILE.
RAILWAY SIGNAL.

No. 340,698. Patented Apr. 27, 1886.

Witnesses:
Frank J. Blanchard
L. M. Freeman

Inventor:
Geo. F. Carlile
By L. B. Coupland & Co.
Attorneys

UNITED STATES PATENT OFFICE.

GEORGE F. CARLILE, OF CINCINNATI, OHIO, ASSIGNOR OF ONE-HALF TO GEORGE L. THOMAS, OF SAME PLACE.

RAILWAY-SIGNAL.

SPECIFICATION forming part of Letters Patent No. 340,698, dated April 27, 1886.

Application filed December 31, 1884. Serial No. 151,633. (No model.)

*To all whom it may concern:*

Be it known that I, GEORGE F. CARLILE, of Cincinnati, county of Hamilton, and State of Ohio, have invented certain new and useful Improvements in an Electric Bell-Cord and Automatic Alarm-Signal for Railway-Trains, of which the following is a full, clear, and exact description, that will enable others skilled in the art to which it appertains to construct and operate the same, reference being had to the accompanying drawings, forming a part of this specification.

The object of this invention is to provide an electrical appliance for use on railway-trains, both passenger and freight, whereby the engineer may be signaled by the conductor from any part of the train, the appliance being arranged in such a manner as to automatically signal and alarm the engineer should a break occur, the alarm being communicated at the same time to the caboose or rear car of a freight-train. The apparatus is varied in its arrangement and operation, in order to meet the different requirements that exist between passenger and freight trains, as will be hereinafter more fully set forth in detail.

Figure 8:
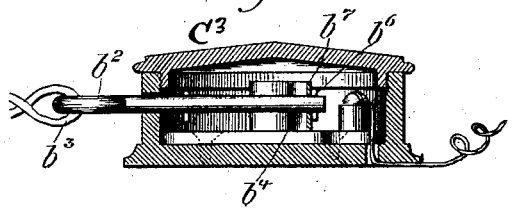
Figure 9:
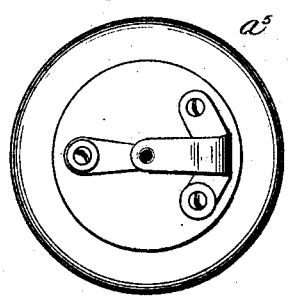
Figure 10:
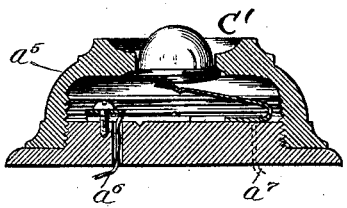
Figure 11:
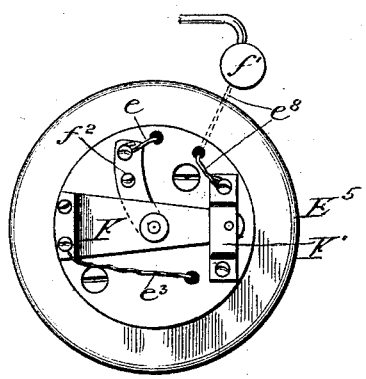

Figure 1 is a diagram or plan showing the manner of using my improvement in connection with a passenger-train. Fig. 2 shows the manner of arranging the same on a freight-train. Fig. 3 shows a portion of two car-structures with the electric couplings united; Fig. 4, a longitudinal section of the electric coupling-connections. Fig. 5 shows the manner of supporting the electric coupling when disconnected; Fig. 6, a plan of the signaling apparatus or box with the cap removed; Fig. 7, a detail of construction; Fig. 8, a vertical section of the box shown in Fig. 6. Fig. 9 is a plan of a push-button with cap and button removed. Fig. 10 is a vertical section of the same with the cap and button in place, and showing the circuit-connections. Fig. 11 is a plan of a double contact-signal device, and Fig. 12 a vertical section of the same.

The manner of arranging and operating my improvement on a passenger-train will first be described.

Referring to the drawings, A represents a vibrating electric gong or bell secured to the board or base A', and placed in any convenient place on the engine.

$A^2 A^3$ are two spool-magnets properly secured to said board between the gong and circuit-wires $a\ a'$. The clapper-arm $A^4$ is secured at the back end to the flat spring $a^2$, the back end of which is attached to the post $a^3$, projecting from and forming a part of the metallic frame supporting the magnets, the front end of said spring having frictional contact with the adjusting-screw $a^4$.

B represents a battery, which is also located on the engine, the connection between the battery and gong being made in the usual manner, and the connection between the engine and cars by means of the electric couplings C C, and the small electric signal alarm or bell C', provided with the push-button $a^5$, as shown in Fig. 1, the disconnected ends of the main circuit-wires indicating the different cars. The signal-bell C' is connected with the main circuit by the branch wires $a^6\ a^7$. One or more of these small bells may be placed in each passenger-car, as may be desired, the push-button attachment being of the ordinary construction shown in Figs. 9 and 10.

$C^5$, Fig. 1, represents one of the sills of the rear car, to which is attached the metallic hanger $b$, to which in turn is bolted one end of the wooden arm $b'$, the opposite end thereof being adapted to engage with the last one of the metallic couplings on the rear car. This arrangement serves to break the circuit, and also to support the coupling out of the way and prevent the same from being accidentally injured. The circuit on passenger-trains is always normally open, and is closed through the signal-bells placed in each car. It will be observed that when the circuit is closed by pressing on one of the push-buttons, for the purpose of ringing the vibrating-gong on the engine, the signal will be repeated back by the ringing of the small bell in the car from which the signal has been sent. Should the small bell fail to sound it will then be known that the signal has not reached the engine, as the clapper-arm on the engine-gong opens and closes the circuit. Thus the ringing of the small bells in the cars is entirely dependent upon the ringing of the large gong on the engine.

Instead of having a number of small bells in each car, one may be used in connection with the signal-box $C^3$, (shown in Figs. 6 and 8,) which has the proper electrical connection with the small bell or buzzer. The outer projecting end of the operating-rod $b^2$ has the signal-cord $b^3$ attached thereto, which may run through one or more cars, thus allowing a signal to be sent from any place in the car. One end of the spring $b^4$ is coiled around the post $b^5$, the opposite end projecting over and having frictional contact with the operating-rod $b^2$ back of the pin $b^6$, so that when the cord $b^3$ is pulled the arm $b^7$ of the spring is brought into contact with the point $b^8$ and the circuit closed, and when the cord is relaxed the spring returns the parts to the normal position shown in Fig. 6. This is a single contact-signal box for use on passenger-trains, but which will be double, as will also the push-button connection on the small bells, when applied to freight trains.

The electric coupling-boxes C C, (shown in Figs. 3 and 4,) and which complete the circuit between the cars, will now be described. These coupling-boxes are exact duplicates, the same reference-letters indicating companion parts. The coupling-boxes are provided with the overlapping ends D D, having recesses $d$ $d$, which detachably engage with the ribs $d'$ $d'$ when the boxes are forced together. These couplings are also provided with the projecting ends D' D', placed on the opposite side from the overlapping ends, and are adapted to telescope inside of the coupling-boxes when the same are coupled together.

To the inside face of the ends D' D' are attached the insulating-blocks $d^2$ $d^2$, which may be of wood or any other suitable material. To the joining-faces of these blocks are secured the outer ends of the spring-plates $d^3$ $d^3$, the inner ends being loose and projecting inside of the couplings. By this arrangement the body of the coupling forms one side of the line and the spring-plate the other side—that is, when the couplings are together the loose ends of the spring-plates are forced away from metallic contact with the couplings and thus form two distinct wires or lines, the end of one wire, $a$, being secured to the body of the couplings by means of the screws $d^4$ $d^4$ and the ends of the companion wire, $a'$, to the spring-plates $d^3$ $d^3$, and terminating in the wooden blocks $d^2$ $d^2$, as shown in Fig. 4. When uncoupled, the loose ends of the spring-plates have metallic contact with the body of the coupling, as indicated by the dotted lines, and closes the circuit. By this means a solid metallic circuit or an open circuit may be used, as the case may require.

The couplings are provided with the tubular extension $d^5$, which has a screw-threaded connection, as shown. One end of the short piece of rubber hose $D^2$ is properly secured to the extension $d^5$, the opposite end being clamped to the tube $d^6$ by means of the open collar $d^7$, the ends of which are connected by the screw-bolt $d^8$. The opposite end of the tube $d^6$ is secured to the sill of the car in any suitable manner, as shown in Fig. 5. The electric wires pass through the hose and tube, the hose serving to protect the wires from injury at the point of coupling, and also relieve the same from all strain.

It will be seen that the manner of constructing the electric couplings is such that they are easily separated when the cars are uncoupled, and no mistake can be made by any one in joining the electric devices. A train breaking in two of course separates the couplings and closes the circuit, sounding the gong on the engine, so that the engineer is at once notified of any break, and an accident thus prevented.

I do not confine myself to the exact form of constructing the electric couplings as shown, but may vary the parts without departing from the principle of my improvement.

The couplings may be made of any suitable material, and are adapted to be used on cars for transmitting electricity for any and all purposes through trains of any kind or length, and no injury occurs to the wires, as the wires on each car are entirely independent of the others. These wires may be run through the cars at any point, or they may pass underneath, as may seem the better or more desirable.

The application of the apparatus to a freight-train is somewhat different from the arrangement on a passenger-train, and will now be described. The vibrating gong E (shown in Fig. 2) is placed on the engine, and is of the same construction and operation as the gong used on the passenger-engine, a cap boxing in the magnets.

Figure 12:
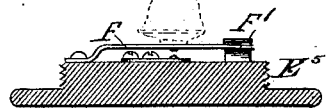

E' represents the battery on the engine; $E^2$, the battery on the caboose, and $E^3$ the companion gong on caboose. The wire $e$, attached to the binding-post $e'$ on the engine-gong, passes through the battery E', and from thence through the different electric couplings, connecting with battery on caboose, and then to post $e^2$ on the small signal-box $E^4$, located in the caboose or rear car of the train. The companion wire, $e^3$, is attached to the post $e^4$ on the engine-gong, then passes through the couplings and crosses the wire $e^5$ and connects the gong on the caboose with the battery $E^2$ to post $e^6$ on the signal-box $E^4$. The wire $e^5$ connects the battery and gong on caboose, being attached to the binding-post $e^7$, and of course has a connection with the wire $e$, leading to the gong on the engine. One end of the wire $e^8$ is connected to the post $f$ on the gong $E^3$ and the opposite end to the post $f'$ on the signal-box $E^4$. This signal-box is provided with a double contact push-button, $E^5$. (Shown in Figs. 11 and 12.) The spring-arm F is rigidly secured at one end, the opposite end being loose and passing underneath the raised part of the bracket F', the button having a bearing on the central part of the arm F, as shown in Fig. 12. The connections of the different wires with the signal-box E⁴ are shown in Fig. 11. The normal position of the spring-arm F leaves the loose end in contact with the under side of the bracket F', as shown in Fig. 12, thus forming a straight metallic circuit, the batteries being so arranged that when coupled together the positive pole of one battery meets the positive pole of the companion battery, so that no action takes place. If the train should break in two, both ends of the circuit are closed in the electric couplings separated, thus causing the gongs on both engine and caboose to ring instantaneously. Now, by pressing on the push-button, the gong on the caboose is cut off and the spring-arm F is forced down in contact with the metal plate $f^2$, to which the wire $e$ is connected, thus bringing the battery on the engine into action and sounding the engine-gong, the signal being automatically repeated back to the signal-box on caboose. A duplicate of the signal-box E⁴ will also be placed on the engine, so that signals can be sent in either direction, thus enabling the engineer to ascertain at any time if everything is in working order. It must also be understood that the metallic hanger $b$ and the wooden arm $b'$ are placed in proper position at each end of the cars, so that when the cars are uncoupled the circuit is broken by forcing the electric coupling onto the end of the wooden arm, which also secures the wires and rubber hose from harm, as shown in Fig. 5. By this arrangement means is provided whereby instantaneous communication may be had with the engine from the rear end of a train, no matter how long the same may be, and the signal being repeated back to the sender it is positively known that the lines are in perfect working order, while, on the contrary, if the signal should not be repeated back, then it is known beyond a doubt that the line is broken at some point.

All the electric couplings and connecting parts are entirely independent of the cars, and they in no way interfere with the making up or movement of the trains. The electric device is automatically disconnected when the cars are uncoupled, and is quickly and conveniently coupled together by hand at the same time that the cars are coupled.

I do not claim in this application the particular construction of circuit-closing push-button, as that forms the subject-matter of a separate application.

Having thus described my invention, what I claim as new, and desire to secure by Letters Patent, is—

1. In an electric signal system for railway-trains, the alarm-gong A, located on the engine and provided with a vibrating clapper-arm, of the magnets $A^2, A^3$, the electric wires $a\ a'$, the battery B, the detachable electric couplings, boxes C, each having spring-plate $d^3$, the end of one wire being connected with the spring and the other with the box, and the signal-box C', located in each car and having proper connection with the main circuit, whereby signals may be sent to the engine and repeated back, substantially as set forth.

2. The combination, with the electric couplings C C, of the main circuit-wires $a\ a'$, the ends of one wire being attached to the spring-plates $d^3\ d^3$, and the ends of the companion wire attached to the screws $d^4\ d^4$, whereby the circuit through the couplings, when connected, is normally open, and closed when uncoupled, substantially as and for the purpose set forth.

3. The combination of the electric coupling-boxes C, each having an extension, D', provided with an insulating-block, $d^2$, having one end rigidly secured to the block, and the main circuit-wire $a$ and $a'$, substantially as described.

4. The combination of the main circuit-wires $a$ and $a'$ and the electric coupling-boxes C, each having the overlapping ends D, with a recess, $d$, the projecting end D', having the rib $d'$, the insulating-block $d^2$, and the spring-plate $d^3$, substantially as described.

5. The combination of a gong located on the engine, the main circuit-wires $a$ and $a'$, connecting the locomotive and cars, the coupling-boxes each having the wires $a$ and $a'$ connected to distinct parts, one of which is insulated when the boxes are coupled, and the signal-box located in each car and connected with the main circuit-wires, substantially as described.

GEORGE F. CARLILE.

Witnesses:
 TOM C. GADDIS,
 GEORGE SILAS THOMAS.